(12) United States Patent
Faulkner et al.

(10) Patent No.: US 11,785,893 B2
(45) Date of Patent: Oct. 17, 2023

(54) GRINDING MILL LINER

(71) Applicant: Bradken Resources Pty Limited, Mayfield West (AU)

(72) Inventors: Craig Frank Faulkner, Capalaba (AU); Terry Alexander Shore, Wallsend (AU); Brad John Drinkwater, Cooks Hill (AU); David Joel Stewart, Maryland (AU)

(73) Assignee: Bradken Resources Pty Limited, Mayfield West (AU)

( * ) Notice: Subject to any disclaimer, the term of this patent is extended or adjusted under 35 U.S.C. 154(b) by 115 days.

(21) Appl. No.: 16/957,041

(22) PCT Filed: Dec. 21, 2018

(86) PCT No.: PCT/AU2018/051400
§ 371 (c)(1),
(2) Date: Jun. 22, 2020

(87) PCT Pub. No.: WO2019/119068
PCT Pub. Date: Jun. 27, 2019

(65) Prior Publication Data
US 2020/0391219 A1 Dec. 17, 2020

(30) Foreign Application Priority Data
Dec. 22, 2017 (AU) .............................. 2017905155

(51) Int. Cl.
*B02C 19/22* (2006.01)
*A01F 29/00* (2006.01)
(Continued)

(52) U.S. Cl.
CPC ............ *A01F 29/00* (2013.01); *B01F 27/052* (2022.01); *B01F 27/1144* (2022.01);
(Continued)

(58) Field of Classification Search
CPC ...... B02C 19/22; B01F 27/052; B01F 27/922; B01F 27/1144; A01F 29/00
(Continued)

(56) References Cited

U.S. PATENT DOCUMENTS

| 3,469,824 A | * | 9/1969 | Futty | ..................... B01F 27/052 366/64 |
| 3,503,564 A | * | 3/1970 | Adam | ..................... B02C 2/005 241/300 |

(Continued)

FOREIGN PATENT DOCUMENTS

| DE | 4232734 A1 | 3/1994 |
| NL | 78530 C | 2/1955 |

OTHER PUBLICATIONS

International Search Report and Written Opinion dated Mar. 6, 2019, directed to PCT Application No. PCT/AU2018/051400; 11 pages.

*Primary Examiner* — Faye Francis
(74) *Attorney, Agent, or Firm* — Morrison & Foerster LLP

(57) ABSTRACT

A liner element for lining a vertical grinding mill agitator including one or more primary mounting portions configured to releasably mount the liner to a shaft of the agitator; and one or more secondary mounting portions configured to releasably mount one or more wear members to the liner. A liner segment including the liner element and at least one wear member is also disclosed.

18 Claims, 6 Drawing Sheets

(51) Int. Cl.
    *B02C 17/16*         (2006.01)
    *B01F 27/052*      (2022.01)
    *B01F 27/922*      (2022.01)
    *B01F 27/1144*     (2022.01)
    *A01F 29/09*       (2010.01)

(52) U.S. Cl.
    CPC .......... *B01F 27/922* (2022.01); *B02C 17/163*
        (2013.01); *B02C 19/22* (2013.01); *A01F 29/09*
        (2013.01); *B02C 2210/02* (2013.01)

(58) Field of Classification Search
    USPC ....................................................... 241/300
    See application file for complete search history.

(56) References Cited

U.S. PATENT DOCUMENTS

| | | | | |
|---|---|---|---|---|
| 3,582,008 A * | 6/1971 | Motz | ...................... | B02C 2/005 |
| | | | | 241/207 |
| 3,682,227 A * | 8/1972 | Motz | ...................... | B22D 19/00 |
| | | | | 164/94 |
| 4,077,575 A * | 3/1978 | Tillmanns | ............. | B02C 13/282 |
| | | | | 241/285.2 |
| 4,242,002 A * | 12/1980 | Kawabata | ............. | B02C 17/163 |
| | | | | 241/46.17 |
| 5,104,049 A * | 4/1992 | McKibben | ............ | B22C 5/0472 |
| | | | | 241/300 |
| 5,456,416 A * | 10/1995 | Hartwig | ................. | A23N 17/02 |
| | | | | 366/302 |
| 5,553,937 A * | 9/1996 | Faccia | ................... | B01F 33/502 |
| | | | | 241/101.76 |
| 5,590,963 A * | 1/1997 | Schuler | ................. | A01K 5/004 |
| | | | | 241/101.76 |
| 5,601,362 A * | 2/1997 | Schuler | ................... | B01F 27/92 |
| | | | | 366/323 |
| 5,647,665 A * | 7/1997 | Schuler | ................ | B01F 33/502 |
| | | | | 241/101.76 |
| 5,732,892 A * | 3/1998 | Neier | ...................... | B02C 19/22 |
| | | | | 241/101.8 |
| 5,772,131 A * | 6/1998 | Dal Maso | .............. | D21B 1/345 |
| | | | | 241/260.1 |
| 5,863,122 A * | 1/1999 | Tamminga | .............. | B01F 27/82 |
| | | | | 366/314 |
| 6,000,649 A * | 12/1999 | Loppoli | .................. | B01F 27/60 |
| | | | | 241/260.1 |
| 6,092,750 A * | 7/2000 | Kooima | .................. | B02C 19/22 |
| | | | | 241/101.76 |
| 6,328,465 B1 * | 12/2001 | Tamminga | ............ | B01F 33/502 |
| | | | | 241/261.1 |
| 6,834,989 B2 * | 12/2004 | Tamminga | ............ | B01F 27/921 |
| | | | | 366/314 |
| 6,890,092 B2 * | 5/2005 | Tamminga | ............ | B01F 27/921 |
| | | | | 366/349 |
| 6,945,485 B1 * | 9/2005 | Douglas | .............. | B01F 33/8305 |
| | | | | 241/101.761 |
| 6,969,191 B2 * | 11/2005 | Tamminga | ............ | B01F 35/751 |
| | | | | 366/314 |
| 7,507,016 B2 * | 3/2009 | Huberdeau | ........... | B01F 27/922 |
| | | | | 366/314 |
| 7,871,024 B2 * | 1/2011 | Peeters | .................... | A01C 3/06 |
| | | | | 366/196 |
| 7,874,720 B2 * | 1/2011 | Hendriks | ............... | A01K 5/004 |
| | | | | 241/101.8 |
| 8,186,611 B1 * | 5/2012 | Boer | ...................... | A01K 5/001 |
| | | | | 241/294 |
| 8,540,177 B2 * | 9/2013 | Baker | .................. | B01F 27/9212 |
| | | | | 366/314 |
| 9,751,055 B2 * | 9/2017 | Tamminga | .............. | B01F 27/92 |
| 10,772,290 B2 * | 9/2020 | Repka | ................. | B01F 27/1143 |
| 10,827,723 B2 * | 11/2020 | Peeters | ............... | A01F 25/2027 |
| 11,044,852 B2 * | 6/2021 | Kooima | .................. | B02C 18/18 |
| 11,122,771 B2 * | 9/2021 | Pastoor | ............... | B01F 33/5013 |
| 2005/0094488 A1 * | 5/2005 | Van Der Plas | ..... | B01F 27/9212 |
| | | | | 366/314 |
| 2008/0101154 A1 * | 5/2008 | Huberdeau | ......... | B01F 27/9212 |
| | | | | 366/65 |
| 2009/0219782 A1 | 9/2009 | Seiler et al. | | |
| 2009/0296517 A1 * | 12/2009 | Tamminga | .............. | A01K 5/004 |
| | | | | 366/314 |
| 2013/0284841 A1 * | 10/2013 | Pellman | ............. | B01F 27/9212 |
| | | | | 241/246 |
| 2020/0009517 A1 * | 1/2020 | Repka | .................... | A01K 5/004 |
| 2021/0010269 A1 * | 1/2021 | Carpenter | ............... | B02C 18/18 |

\* cited by examiner

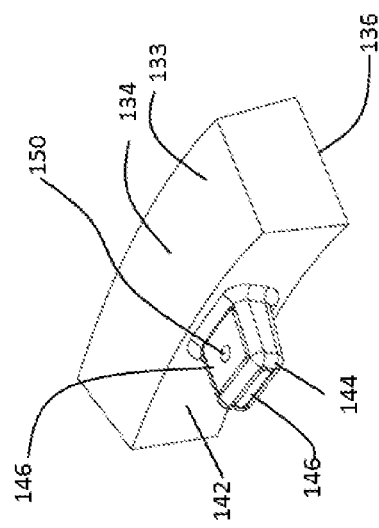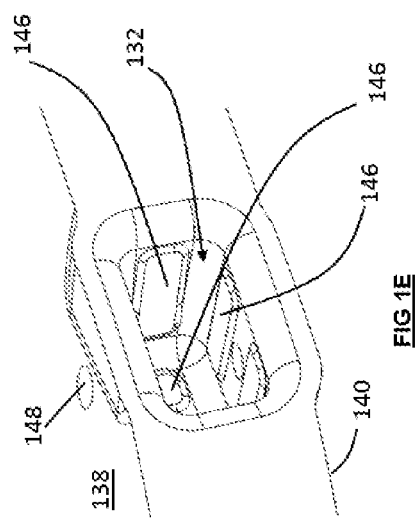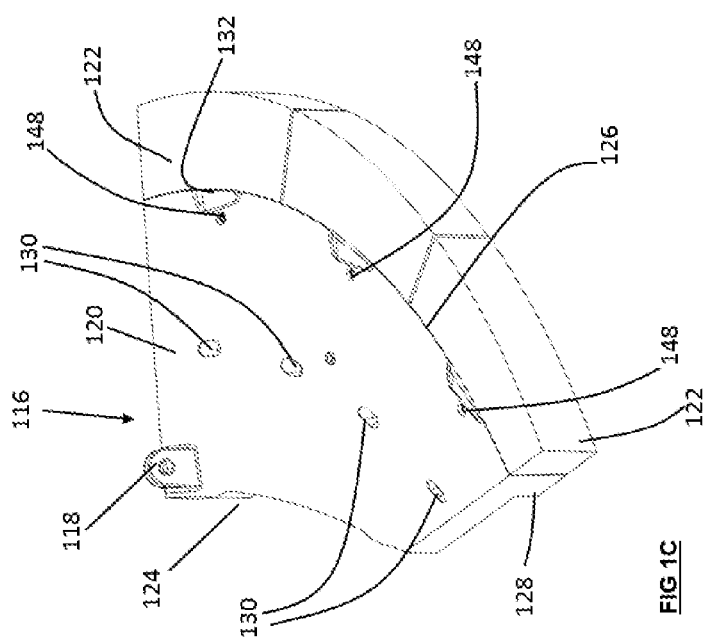

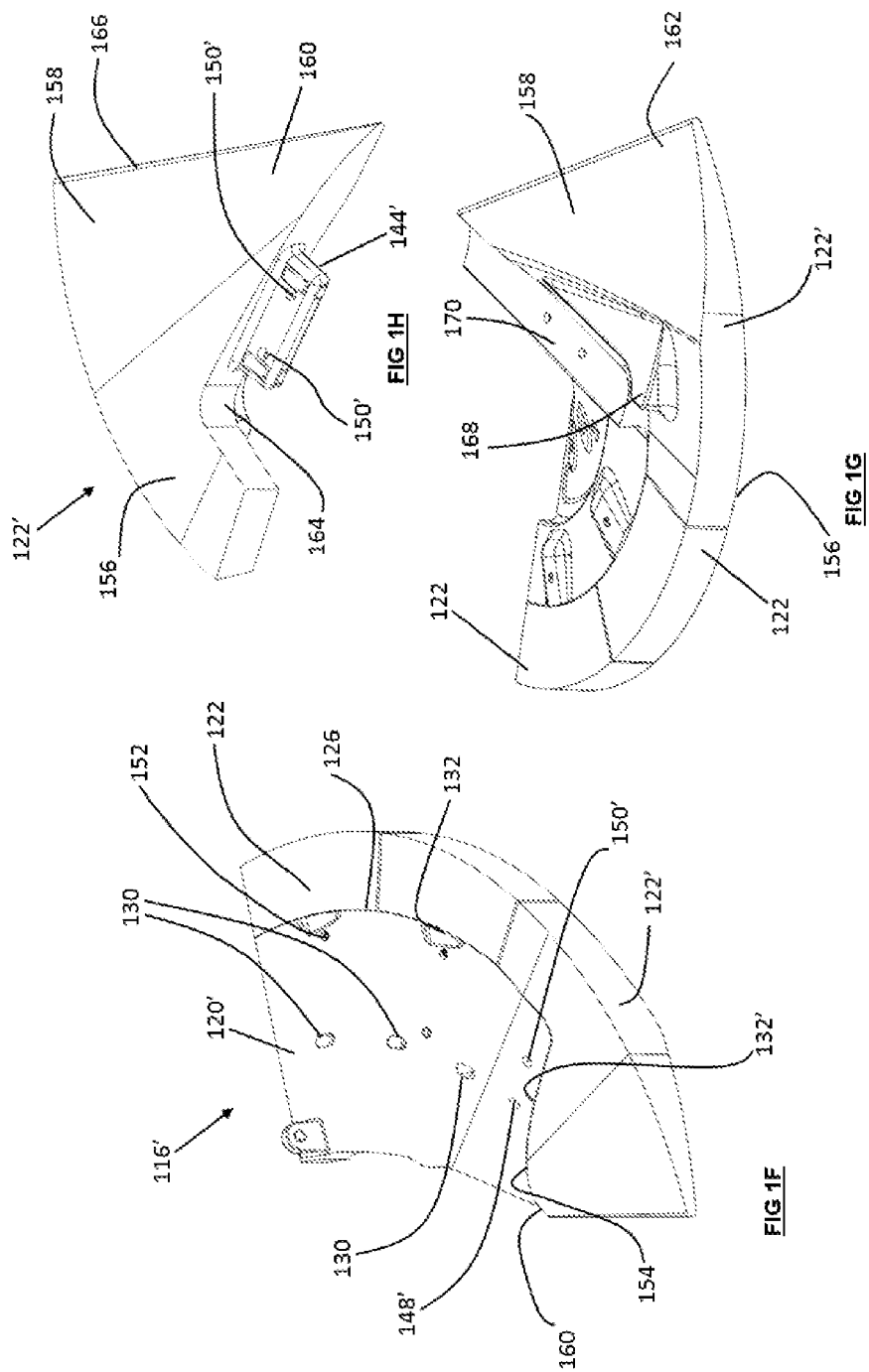

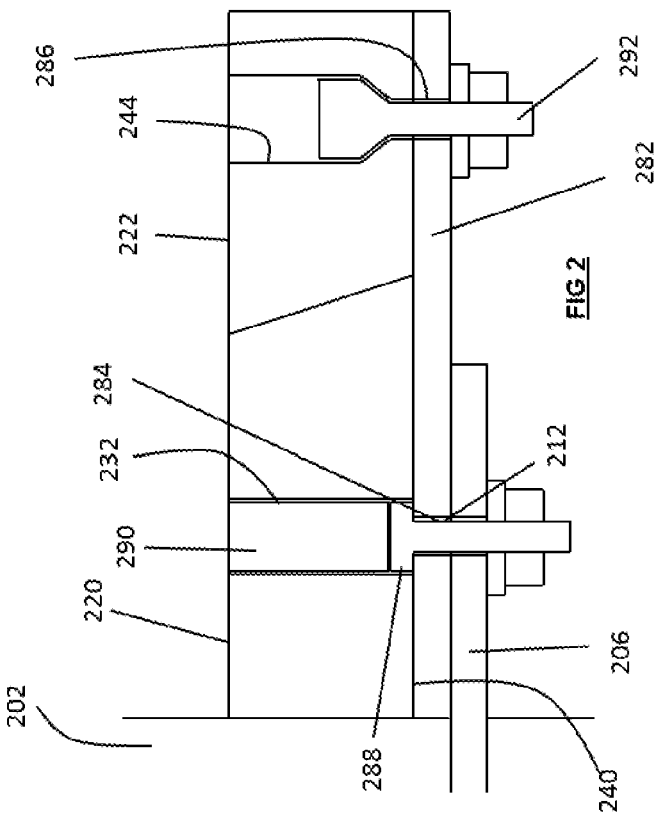
FIG 2
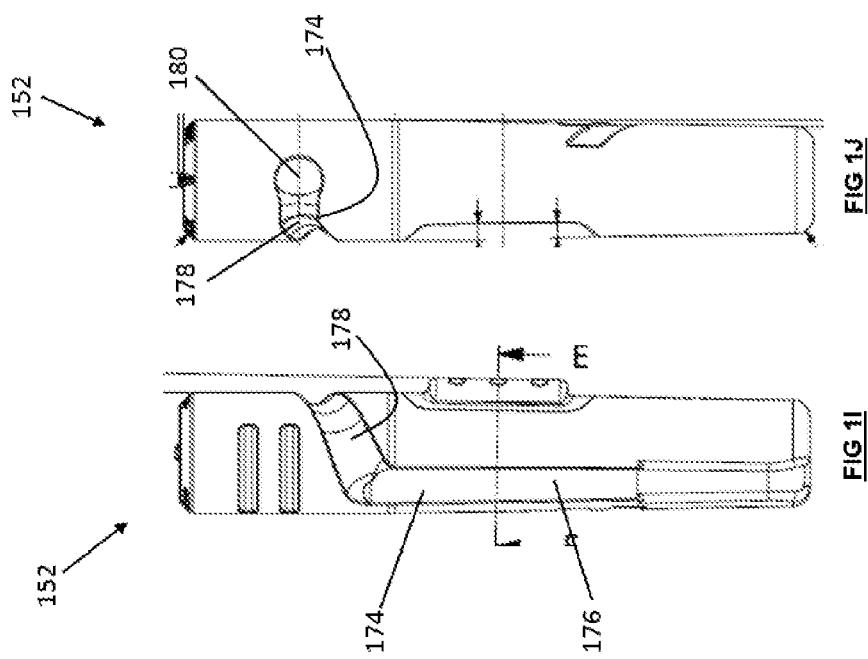
FIG 1I
FIG 1J

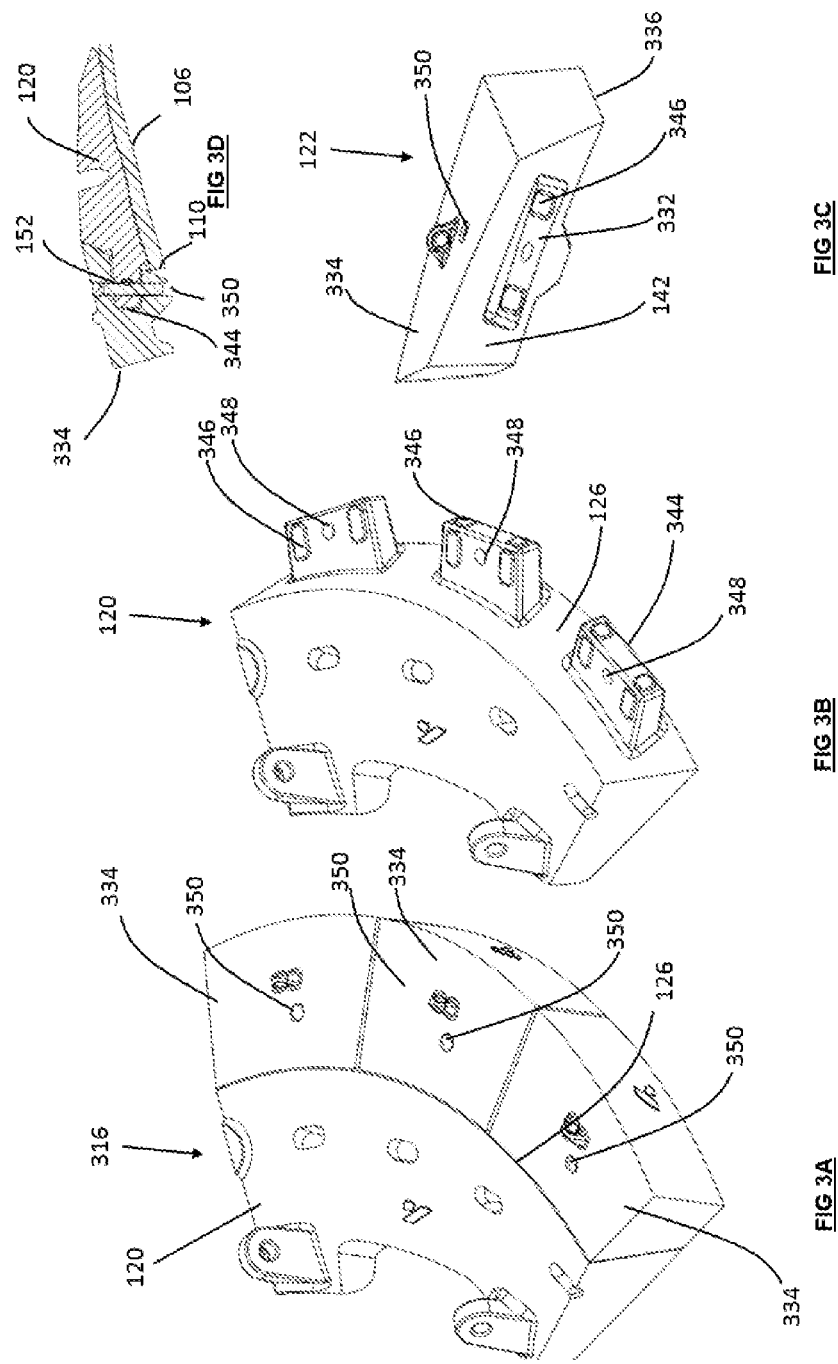

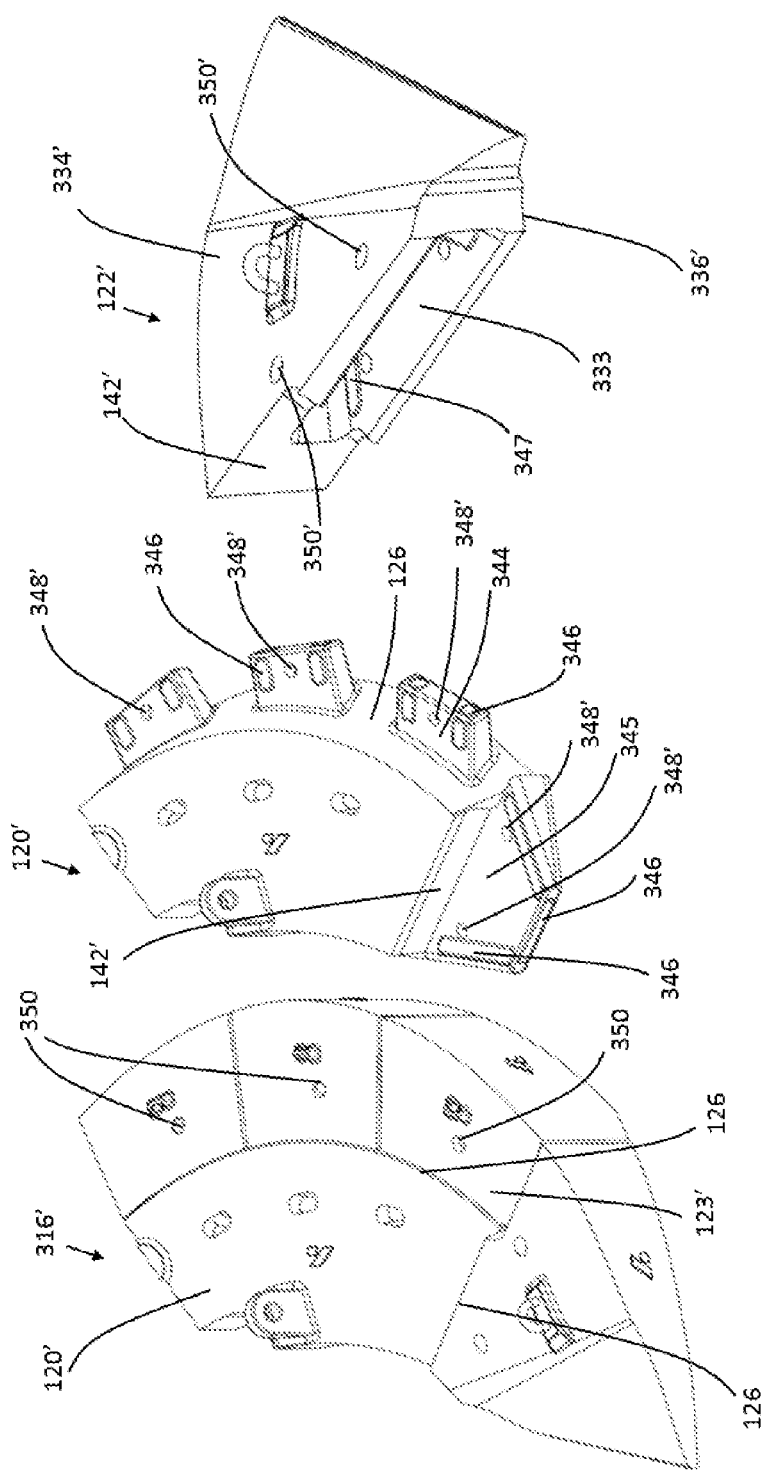

GRINDING MILL LINER

CROSS-REFERENCE TO RELATED APPLICATIONS

This application is a national stage application under 35 USC 371 of International Application No. PCT/AU2018/051400, filed Dec. 21, 2018, which claims the priority of Australian Application No. 2017905155 filed Dec. 22, 2017, the entire contents of each of which are incorporated herein by reference.

FIELD OF THE DISCLOSURE

This disclosure relates to liners for grinding mills of the type that include a generally vertically oriented agitator. Such mills are known as, for example, vertical grinding mills, tower mills, vertical regrind mills or stirred mills.

BACKGROUND OF THE DISCLOSURE

Vertical grinding mills (or tower mills, stirred mills, vertical regrind mills, etc.) generally include a chamber containing the material to be ground, grinding media (e.g. steel or ceramic balls) and water. Such mills further include an agitator disposed in the chamber, which rotates about a generally vertical longitudinal axis to move the contents of the chamber. This movement of the contents of the chamber (e.g. between the grinding media and material to be ground) results in abrasion and/or attrition of the material to be ground.

In general, the agitator of the vertical grinding mills comprises a longitudinal shaft that supports one or more blades that extend radially from the shaft. The blades may be helically formed about the shaft or may be planar (i.e. so as to form discs extending about the shaft). It is predominantly the movement of these blades that results in movement of the contents of the chamber.

The exposed nature of these blades (e.g. to the abrasive contents of the chamber) means that they can be particularly susceptible to wear in operation. When such wear occurs, replacement of the blades can be problematic due to their considerable size and weight.

It is to be understood that, if any prior art is referred to herein, such reference does not constitute an admission that the prior art forms a part of the common general knowledge in the art, in Australia or any other country.

SUMMARY OF THE DISCLOSURE

Disclosed herein is a liner element for lining a vertical grinding mill agitator. The liner element comprises one or more primary mounting portions configured to releasably mount the liner to a shaft of the agitator, and one or more secondary mounting portions configured to releasably mount one or more wear members to the liner.

As will be discussed further below, the provision of primary and secondary releasable mounting portions provides versatility in regards to use of the liner element. The primary mounting portions allow replacement of the liner element on the shaft (or a blade of the shaft) of the agitator. The secondary mounting portions allow replacement of wear members on the liner element without the need to remove the liner element from its mounting on the shaft.

In one embodiment each secondary mounting portion may be configured to mount the one or more wear members at a peripheral edge of the liner element. The peripheral edge of the liner element may be particularly susceptible to wear in use. Thus, the wear members may be mounted at a portion of the liner element that experiences more wear than other portions of the liner element. The provision of wear members at these locations means that instead of the liner element needing replacement, the wear members can be replaced (which may be both less time consuming and less expensive).

The secondary mounting portions may be configured to mount the one or more wear members at positions other than the peripheral edge of the liner element. The secondary mounting portions may be configured to mount one or more wear members at one or more locations of the liner element that are particularly susceptible to wear (e.g. that experience greater wear than the average or normal wear of the liner element) in use. Such areas may be e.g. be protruding portions of the liner element (i.e. protruding from planar surfaces of the liner element).

In one embodiment each primary mounting portion may comprise an aperture for receipt of a fastener, to releasably mount the liner element to the shaft of the agitator. The fastener may be in the form of a bolt. The aperture may align with a corresponding in e.g. a blade of the shaft and the fastener may be received through the apertures. The aperture may have an elongate shape. The long axis of the elongate aperture may be generally aligned in a circumferential direction relative to an axis of the shaft. The elongate shape of the aperture may allow some leeway in mounting the line element to the shaft.

In one embodiment the liner element may be configured to be mounted to a helical blade of the agitator shaft. The liner element may have a generally helical form. The liner element may be in the form of a helical segment (i.e. the shape may be such that it is a segment of a larger helical shape).

In one embodiment the liner element may be configured to be mounted to a disc shaped blade of the agitator shaft. The liner element may comprise a generally planar form. The liner element may be generally in the form of a sector of a circle.

In one embodiment the liner element may comprise a proximate edge that locates proximate the shaft when the liner element is mounted thereto. The liner element may further comprise a distal edge that is distal from the shaft when the liner element is mounted thereto. The proximate edge of the liner element may abut the shaft when mounted thereto. The proximate edge may comprise indentations. The distal edge may be curved.

In one embodiment the one or more secondary mounting portions may be spaced along the distal edge of the liner element. In this way, the one or more wear members may be mounted at the distal edge. This positioning of the secondary mounting portions may facilitate mounting of the wear members due to the accessibility of the distal edge (i.e. as opposed to other portions of the liner element when mounted to the shaft).

In one embodiment the distal edge may comprise an enlarged portion that may define a lip extending along the distal edge. The enlarged portion may increase the strength of the liner element at the portion where the wear members are to be mounted (e.g. when the secondary mounting portions are also at the distal edge). The liner element may be configured to be mounted to a blade of the agitator shaft, and the lip may extend over an edge of the blade when mounted thereto. In this way, the liner element may provide protection to the edge (or an edge surface) of the blade. Further, the lip may provide a stop, such that when mounting the liner element onto the blade, abutment of the lip against the edge of the blade ensures correct alignment of the liner element on the blade (e.g. in the radial direction).

In one embodiment the liner element may further comprise an attachment means for attachment of a lifting apparatus for lifting the liner element. The attachment means may comprise a lug. This may facilitate handling of the liner element (e.g. for installation and replacement).

Further disclosed is a liner segment comprising a liner element as set forth above, and one or more wear members. Each wear member comprises a wear member mounting portion for releasably mounting the wear member to a corresponding secondary mounting portion of the liner element. The liner may comprise a plurality of wear members.

As set forth above, the provision of replaceable wear members can provide versatility in regards to maintaining the agitator. The ability to replace the wear members provides an operator with the opportunity to only replace those portions (e.g. particular wear members) of the agitator that are worn and require replacement.

In one embodiment each secondary mounting portion comprises a protrusion, and each wear member comprises a socket for receipt of the protrusion of a respective wear member. Alternatively, in one embodiment each wear member mounting portion may comprise a protrusion, and each secondary mounting portion may comprise a socket for receipt of the protrusion of a respective wear member.

This may enable the replaceable mounting of the wear member (or members) to the liner element. The shape of the protrusion may be generally complementary to the shape of the socket. The mounting may be in the form of a transition (e.g. tight) fit between the socket and the protrusion. A retainer arrangement for retaining the protrusion in the socket may be provided. The retainer arrangement may restrict movement of the protrusion out of the socket.

The replaceable mounting may alternatively or additionally be in the form of a fastener and a threaded (or non-threaded) aperture. For example, the wear member mounting portion (of the wear member) may comprise an aperture and the secondary mounting portion (of the liner element) may comprise a further aperture. The apertures may be aligned and a bolt can be passed through the apertures to mount the wear member to the liner element. The bolt may comprise a locking arrangement to retain the bolt in the apertures. The aperture of the secondary mounting arrangement may comprise a thread to retain the bolt.

Other arrangements may provide mounting of the one or more wear members to the liner element, as long as such arrangements provide releasable mounting such that the wear members can be released from the liner element (e.g. without damage to the liner element and without removing the ability to replace the removed wear member). For example, mounting arrangements using threads, moveable (e.g. spring loaded) detents, clips, deformable portions, etc. may be suitable for releasable mounting of the one or more wear members to the liner element.

In one embodiment the liner segment may comprise a mounting member that may be configured to be mounted or secured to one or more secondary mounting portions and one or more wear members mounting portions. In this way, the wear members may not be directly mounted to the liner element and may instead be mounted to the liner element via the mounting member. The mounting member may additionally provide support to the liner element and or wear member(s). The mounting member may be in the form of a frame or plate (e.g. base plate) that interconnected the wear member(s) and the liner element. In one embodiment, the mounting member may be a base plate that is also secured to the shaft.

In one embodiment each protrusion may comprise a first recess and each socket comprises a second recess, the recesses being arranged such that when a protrusion of the one or more protrusions is received in a respective socket, the recesses of the protrusion and socket align to define a lock passage (i.e. retainer arrangement). The alignment may be in the form of longitudinal axes of the recesses being aligned. The liner segment may comprise one or more locks. Each lock may be for receipt in a lock passage to lock a respective protrusion in a respective socket. Each recesses may be in the form of a passage that extends from one surface to another, or may be a blind hole that only extends partway into the material.

Thus, the lock may be positioned so as to span the joint between the wear member and liner element such that the lock restricts movement of the wear member relative to the liner element.

In one embodiment each lock may comprise a retainer for releasably retaining the lock in a position in which the lock locks the protrusion in the socket. The retainer may be in the form of a detent or groove that interact to retain the lock in the locking position. The retainer may alternatively be a spring-loaded member or a compressible member.

In one embodiment the liner elements and the one or more wear members are made from the same or similar material.

In one embodiment the liner element may be formed of a different material to the one or more wear members. The one or more wear members may be formed of a harder material than the liner element.

The liner element and/or the wear members may be formed of cast white iron or steel that may be cast or plate or fabricated. The liner element and/or wear members may additionally comprise ceramic tiles that line its surface. The liner and/or wear members may alternatively comprise hard facing (e.g. in the form of a weld overlay). Accordingly, the materials of the liner element and/or the wear members may be rigid such that the liner element comprises a rigid body.

The liner element and/or wear members may alternatively be formed of a rubber composite. This may be in the form of a rubber liner frame or baseplate (which may be cast, plate or fabricated). The liner element and/or wear members, when formed of a rubber composite, may include a ceramic tile inlay on a surface thereof.

In one embodiment each wear member may be configured such that, when mounted to the liner element, an in use upper surface of the wear member may form a generally continuous surface with an in use upper surface of the liner element. The upper surface of the wear member may be flush with the upper surface of the liner element. This may avoid exposed edges that may be susceptible to wear in use.

In one embodiment, when mounted to the liner element, the one or more wear members may be arranged so as to experience more wear than the liner element in use. The wear members may be mounted to the liner element at locations that are more susceptible to wear in use.

In one embodiment the liner segment comprises a plurality of wear members.

In one embodiment, when mounted, the plurality of wear members may form an extension of the edge of the liner element having a generally continuous profile. This may avoid exposed edges that may be susceptible to wear in use.

In one embodiment, when mounted to the liner element, the plurality of wear members may be adjacent to one another. This may avoid gaps between the wear members where the liner element may be susceptible to wear.

In one embodiment, when mounted to the liner element, the plurality of wear members may not be directly mounted to the shaft. This may ensure that the liner segment can be removed as a single piece.

Also disclosed is a liner segment for a vertical grinding mill agitator. The liner segment comprises a body formed of a first material and a peripheral portion formed of a second material that is different to the first material. The liner segment further comprises a mounting portion for releasably mounting the liner to a shaft of the agitator. The material of the peripheral portion may be harder than the material of the body.

The body and/or the peripheral portion may be formed of cast white iron or steel that may be cast or plate or fabricated. The body and/or the peripheral portion may additionally comprise ceramic tiles that line its surface. The body and/or the peripheral portion may alternatively comprise hard facing (e.g. in the form of a weld overlay).

The body and/or the peripheral portion may alternatively be formed of a rubber composite. This may be in the form of a rubber liner frame or baseplate (which may be cast, plate or fabricated). The body and/or the peripheral portion, when formed of a rubber composite, may include a ceramic tile inlay on a surface thereof.

Further disclosed is a wear member for a liner segment as set forth above in at least one embodiment, the wear member comprising a body and a wear member mounting portion for releasably mounting the wear member to a corresponding secondary mounting portion of the liner element.

The wear member may be otherwise as disclosed in respect of any form of the liner segment as set forth above.

Further disclosed is an agitator comprising a shaft having a support structure and a plurality of liner segments as set forth above in at least one embodiment, mounted to the support structure.

Further disclosed is a method of maintaining an agitator for a vertical grinding mill. The method comprises mounting a replaceable liner to the agitator, mounting a wear element to the replaceable liner; and replacing the wear element mounted to the replaceable liner with a replacement wear element, while the wear liner remains mounted to the agitator.

BRIEF DESCRIPTION OF THE FIGURES

Embodiments will now be described by way of example only, with reference to the accompanying drawings in which:

FIG. 1C is a perspective view of a first liner segment of the agitator of FIG. 1A;

FIG. 1D is a perspective view of a wear member of the first liner segment of FIG. 1C;

FIG. 1E is a detailed view of a secondary mounting portion of the first liner segment of FIG. 1C;

FIG. 1F is a perspective view of the top of a second liner segment of the agitator of FIG. 1A, with wear members mounted thereto;

FIG. 1G is a perspective view of the underside of the second liner segment of FIG. 1F;

FIG. 1H is a perspective view of a wear member of the second liner segment of FIGS. 1F and 1G without the second liner element mounted thereto;

FIGS. 1I and 1J are side views of a lock;

FIG. 2 is a section view of a further embodiment of a liner segment;

FIG. 3A is a perspective view of a further embodiment of a first liner segment;

FIG. 3B is a perspective view of the first liner element of the first liner segment of FIG. 3A;

FIG. 3C is a perspective view of one of the wear members of the first liner segment of FIG. 3A;

FIG. 3D is a sectional view of the liner segment of FIG. 3A mounted to an agitator blade;

FIG. 4A is a top perspective view of a further embodiment of a second liner segment with wear members mounted thereto;

FIG. 4B is a perspective view of the second liner element of the second liner segment of FIG. 4A; and FIG. 4C is a perspective view of one of the wear members of the second liner segment of FIG. 4A.

DETAILED DESCRIPTION OF THE DISCLOSURE

Figure 1B:
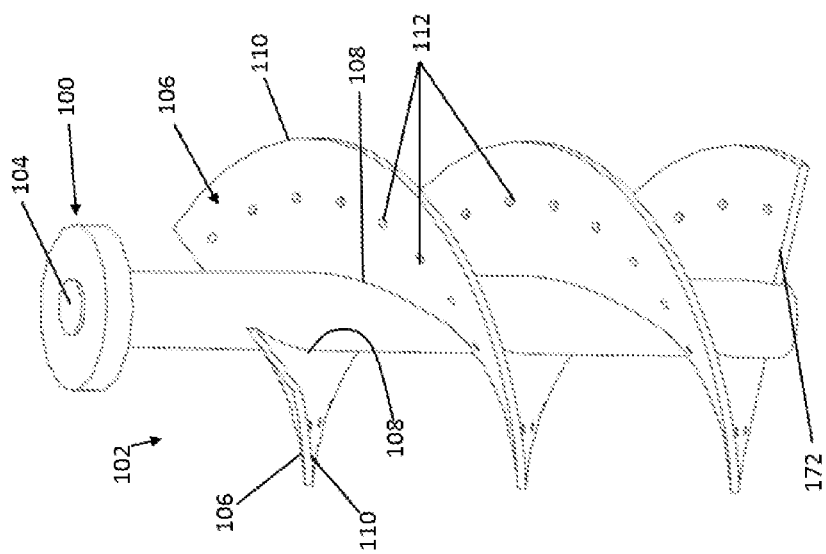
FIG. 1B is a perspective view of the shaft of the agitator of FIG. 1A.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Figure 1A:
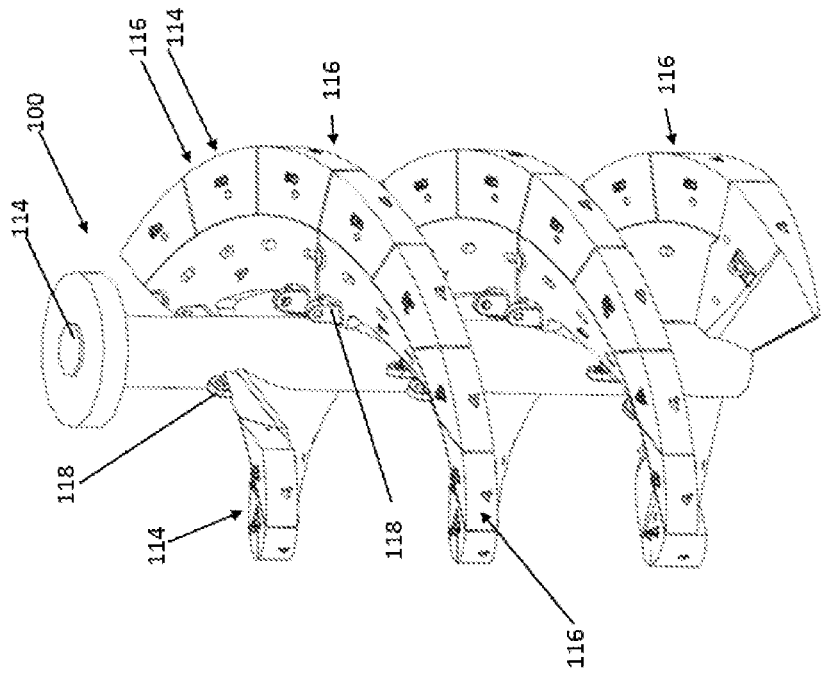
FIG. 1A is a perspective view of an agitator for a vertical grinding mill including a plurality of liner segments.

FIGS. 1A and 1B show an agitator 100 for a vertical grinding mill. The agitator 100 comprises an elongate circular shaft 102 that extends along a generally vertical (in use) longitudinal axis. An in use upper end of the shaft 102 comprises a coupling portion 104 for coupling to a driver of a vertical grinding mill. Although not illustrated, the coupling portion 104 may be coupled to e.g. a drive shaft by way of a plurality of fasteners, locking mechanism, welding, etc. Thus, in operation, the agitator 100 may be located in a chamber of a vertical grinding mill, and may be rotated (about the longitudinal axis) to grind material in the chamber.

The shaft 102 of the illustrated agitator 100 further comprises two helical blades 106 in a double helix configuration. Each blade 106 comprises a single flight that is secured (e.g. by welding) at an inside (proximal) edge 108 to the cylindrical body of the shaft 102 and extends radially from the proximal edge 108 to an outside (distal) edge 110. A plurality of apertures 112 extend through each blade 106. The apertures 112 are spaced along a line that generally follows the helical curve of the blade 106 (and the edges 108, 110). Each aperture 112 is closer to the distal edge 110 of the blade 106 than the proximal edge 108.

As is apparent from FIG. 1A, the agitator 100 further comprises two liners 114 that each line a respective helical blade 106. Each liner 114 is helical and has a form that generally corresponds to the helical form of the respective blade 106 that it lines (or covers). The liners 114 are each formed from a plurality of liner segments 116 that locate adjacent one another along the length of the liner 114.

Separating each liner 114 into these liner segments 116 may facilitate installation and replacement of the liner 114. For example, it may be easier to handle individual liner segments 116 rather than an entire liner 114 during installation or replacement. Furthermore, in operation, the wear rate may not be consistent across the entire liner 114. Thus, one or more portions of each liner 114 may experience more wear than other portions. In such circumstances it may be desirable to replace that portion without replacing the entire liner 114. The provision of liner segments 116 (as opposed to a single liner 114 for each blade 106) facilitates such replacement. This replacement is further facilitated by an attachment means located at an upper corner (proximate the shaft) of the liner segment 116, which in the present embodiment is in the form of a lifting lug 118. The lifting lug 118 can be used to attach the liner segment 116 to e.g. a hoist, to remove the liner segment 116 from the agitator 100. Each liner segment 116 may alternatively or additionally include a threaded insert (e.g. disposed in a central portion of the liner). The threaded insert may be mounted by way of adhesive, or may be cast into the liner. When present, a threaded lifting eye may be used (with the threaded insert) to handle the liner segment 116.

FIG. 1C shows a liner segment 116 in more detail. As is apparent from this figure, the liner segment 116 is formed from a liner element 120 and a plurality of (in this case three) wear members 122 mounted to the liner element 120. The liner element 120 has a generally helical form and comprises a curved inside (proximal) edge 124 that generally follows, and abuts, an outer surface of the body of the shaft 102 when installed. The liner element 120 extends radially outward from the proximal edge to a similarly curved outside (distal) edge 126. The width of the liner element 120 (i.e. between the proximal 124 and distal 126 edges) is larger than the width of corresponding helical blade 106 on which the liner element is to be mounted. In this way, the liner element 120 extends across the helical blade 120 and beyond the distal edge 110 of the helical blade 106 when installed so as to cover (and protect) the upper surface of the helical blade 106.

The liner element 120 has a generally consistent thickness across its width, except for at the distal edge 126. The distal edge 126 comprises a thicker portion that defines a lip 128 of the liner element 120. When installed, this lip 128 hangs over (or wraps around) the distal edge 110 of the helical blade 106 so as to provide protection to the distal edge 110 of the helical blade 106.

The liner element 120 can be secured in this position by way of a plurality of primary mounting portions, which in the present embodiment are in the form of mounting apertures 130 extending through the liner element 120. The mounting apertures 130 are spaced along a line that generally follows the curve of the proximal 124 and distal 126 edges. The positioning of the mounting apertures 130 corresponds to the positioning of the apertures 112 formed in the helical blades 106 (to which the liner element 120 is mounted). Hence, the liner element 120 can be positioned on a helical blade 106 such that each set of apertures 112, 130 (i.e. on the helical blade 106 and the liner element 120) are aligned. In this way, a bolt can be received through each aligned aperture pair 112, 130 to releasably mount the liner element 120 to the shaft 102 of the agitator 100, via the helical blade 106. To assist in this process, the mounting apertures 130 of the liner element 120 are elongate (so as to have a generally obround shape). The long axis of each elongate aperture 130 is oriented in the direction along the curve of the helix (i.e. so as to be generally parallel to the proximal 124 and distal 126 edges). This provides some flexibility in regard to alignment of the apertures 112, 130 (and means that exact alignment may not be necessary), so as to facilitate mounting of the liner element 120 to the shaft 102 of the agitator 100.

The liner element 120 further comprises a plurality (in this case three) secondary mounting portions, which in the present embodiment comprise sockets 132 formed in the distal edge 126 of the liner element 120. As will be described in more detail below, each socket 132 is configured to allow releasable mounting of a corresponding wear member 122 to the liner element 120.

Three such wear members 122 are mounted at the distal edge 126 of the liner element 120 illustrated in FIG. 1C. Each wear member 122 extends along the distal edge 126 of the liner element 126 and includes a body 133 having a generally rectangular profile. The wear members 122 collectively form a generally continuous edge profile. That is, the surfaces of adjacent wear members 122 are flush with one another (when installed) so as to form a generally continuous profile. The in use upper 134 and lower 136 surfaces of the wear member body 133 are also flush with the corresponding upper 138 and lower 140 surfaces (on the lip 128) of the liner element 120. In this way, the wear members 122, in effect, form an extension of the edge of the liner element 120 distal edge 126. The smooth transition between the surfaces 138, 140 of the liner element 120 and the surfaces 134, 136 of the wear members 122 avoids exposed edges that would otherwise be susceptible to wear in use.

An internal (or proximal) surface 142 of each wear member 122 abuts the distal edge 126 of the liner element 120 when mounted thereto. A protrusion 144 extends from this internal surface 142 and is complementary in form to a corresponding socket 132 formed in the distal edge 126 of the liner element 120. In this way, the protrusion 144 can be received in the corresponding socket 132 to mount the wear member 122 to the liner element 120 (as show in FIG. 1C).

The protrusion 144 and socket 132 are more clearly shown in FIGS. 1D and 1E. For clarity, only this socket/protrusion pair 132, 144 will be described, but it should be appreciated that this pair 132, 144 is representative of all socket/protrusion pairs 132, 144 forming part of the liner segment 116. As is apparent from FIG. 1D in particular, the protrusion 144 has a generally rectangular profile. The edges of the protrusion 144 are rounded, as is the connection between the protrusion 144 and the internal surface 142 of the wear member 122. The entrance, and the internal edges of the socket 132 are similarly rounded. This can reduce stress concentrations, facilitate manufacture, and may assist insertion of the protrusion 144 into the socket 132 (e.g. the rounded surfaces may guide the protrusion 144 into the socket 132).

Raised mating surfaces 146 are provided on the protrusion 144 and in the socket 132. The protrusion 144 comprises raised mating surface 146 on its opposite upper and lower surfaces, and on its end surface (at the distal end of the protrusion). The socket 132 comprises two raised surfaces on each of its opposing upper and lower surfaces, and on its internal end surface. A raised mating surface 146 is also provided on each of the side surfaces of the socket 132. These raised surfaces 146 facilitate insertion of the protrusion 144 into the socket 132, and subsequent removal of the protrusion 144 from the socket 132.

The socket 132 comprises an associated recess, in the form of a bore 148, which extends from the upper surface 138 of the liner element 120 (at the distal edge) through to the lower surface 140 of the liner element 120 (i.e. so as to extend across the socket 132). The bore 148 extends at an angle (i.e. on decline) relative to the upper surface 138 of the liner element 120 (i.e. in the direction of the distal edge 126 of the liner element 120). The protrusion 144 also comprises a corresponding recess in the form of a bore 150 that extends through the protrusion 144 from the upper surface of the protrusion 144 to the lower surface of the protrusion 144. The bore 150 formed in the protrusion 144 has a generally circular cross-profile that tapers inwardly from an in use upper end of the bore 150 (at the upper surface of the protrusion 144) to an in use lower end of the bore 150 (at the lower surface of the protrusion 144).

When the protrusion 144 is received in the socket 132, the bore 148 of the socket 132 and bore 150 of the protrusion 144 align along a common longitudinal axis (to form a lock passage). In this way, a lock 152 can be received in the aligned bores 148, 150, through the opening of the socket bore 148 at the upper surface of the liner element 120. Location of the lock 152 in the aligned bores 148, 150 can retain the respective protrusion 144 in the corresponding socket, 132 so as to mount the corresponding wear member 122 to the liner element 120 (and so as to prevent dislodgement of the wear member 122 from the liner element 120).

Although not apparent from the present figures, the lock 152 can include a retainer arrangement for releasably retaining the lock 152 in a position in which it locks the protrusion in the socket.

The lock 152 is better shown in FIGS. 1I and 1J. The retainer arrangement is in the form of a groove 174 having an axial portion 176 (extending generally parallel to a longitudinal axis of the lock 152) and a helical portion 178 (extending circumferentially). The bore 150 of each protrusion 144 comprises a detent (not shown) extending inwardly from the internal wall of the bore 150. As the lock 152 is inserted into the bore 150, the groove 174 and detent interengage and the groove 174 rides over the detent. Initially the detent travels along the axial portion 176 of the groove 174, which enables insertion of the lock 152 into the bore 150. When the detent reaches the helical portion 178 of the groove 174, the lock 152 is caused to rotate (i.e. due to the detent following the groove). At its distal end, the groove 174 comprises a deeper portion that defines a seat 180. As the detent travels along the groove 174 it is compressed. Once the detent reaches the seat 180 of the groove 174, after the lock 152 is turned through the helical portion 178, it is able to decompress so as to extend into the seat 180 and so as to be retained in the seat 180.

To enable this movement of the lock 152 (i.e. into the bores 148, 150 and then into the retained position), an end of the lock 152 may comprise an engagement means. This engagement means may be in the form of a (e.g. hexagonal) socket for receipt of a tool to push the lock 152 into the recesses and then rotate the lock 152 into the retained position.

As should be appreciated each lock 152 can be removed from the aligned bores 148, 150 by rotation in the opposite direction (e.g. using a tool). When its respective lock 152 is removed, the protrusion 144 can be moved out of its corresponding socket 132, and in this way the wear member 122 is released from the liner element 120. This means that the wear members 122 can be replaced without requiring removal of the remaining wear members 122 from the liner element 120, or of the liner element 120 from the helical blade 106. This may allow improved management of the wear of the agitator 100. For example, it avoids the needs to replace an entire liner element 120, which can be both costly and difficult (due to the size of such liner elements), when only one portion of that liner element 120 is worn.

Wear of the liner elements 120 (and wear members 122) may also be managed by providing wear members 122 that are formed of a different material to the liner element 120. For example, the liner element 120 and/or wear members 122 may be formed of white iron, steel or rubber, and may optionally include ceramic inserts or plating.

FIGS. 1F, 1H and 1G illustrate a further liner segment 116'. The further liner segment 116' generally includes the same features as the previously described liner segment 116, but differs in that it is configured for mounting at the in use lower end of the shaft 102. Due to this location, the shape of this further liner segment 116', and the location of some of the features, differ to the previously described liner segment 116.

A first difference is that, because this liner segment 116' lines (and protects) the end of the helical blade 106, the liner element 120' comprises a secondary mounting portion (in the form of a socket 132') on an end surface 154 (i.e. a radially extending edge) of the liner element 120'. The wear member 122' that mounts to this socket 132' differs to those previously described in that it does not have a generally elongate form with a rectangular profile. The wear member 122' includes a body portion 156 that is similarly shaped to the previously described wear members 122, and a wedge portion 158. The body portion 156 extends along the distal edge 126 of the liner element 120 and the wedge portion 158 projects outwardly from the end surface 154 of the liner element 120' (when mounted thereto). In this way, the wear member 122' wraps around the edge surfaces 126, 154 of the liner element 120' that would otherwise be exposed.

The upper 160 and lower 162 surfaces of the wedge portion 158 taper inwardly from an end 164 at which the wear member 122' is mounted to the liner element 120, to a distal end 166. Although the thickness of the wear member 122' is generally consistent, a raised padded region 168 projects from an underside 162 of the wear member 122'. This padded region 168 corresponds to a lip 170 that projects from an underside 140 of the liner element 120 and wraps around the end edge 172 (see FIG. 1B) of the helical blade 106. Thus, the lip 170 of the liner element 120 protects the helical blade 106 and the padded region 168 protects the liner element 120'.

The socket 132' of the liner segment 116 differs in that each of the socket 132' and protrusion 144' comprises two recesses 148', 150', and two corresponding locks 152 for receipt in the lock passages defined by those recesses 148', 150' when aligned. This may form a more secure connection between the wear member 122' and the liner element 120' and may further restrict rotation of the wear member 122' relative to the liner element 120' (i.e. by providing two fixing points).

In practice, each liner 114 may be installed by first forming a plurality of liner segments 116. Each liner segments 116 can be formed by mounting wear members 122 (via the sockets 132 and corresponding protrusions 144) onto a liner element 120. Once assembled, the liner segments 116 can be mounted to the blades 106 to form liners 114.

An alternative installation method may involve first mounting liner elements 120 to the blades 106, and subsequently mounting wear members 122 to the mounted liner elements 122 so as to form the liners 114.

Maintenance of the liners 114 may include replacing individual wear members 122 or replacing entire liner segments 116 (with the wear members 122 mounted thereto). Replacement of a wear member 122 (e.g. due to particular wear of that wear member 122) may be performed by removing the lock 150 of that wear member 122 from the aligned bores 148, 142 (e.g. using a tool) and, subsequently, removing the protrusion 144 from the socket 132. A replacement wear member 122 can then be mounted to the liner element 120 at the location of the previously removed wear member 122.

FIG. 2 provides an alternative arrangement for mounting one or more wear members 222 to a liner element 220. This arrangement includes a mounting member in the form of a base plate 282. The base plate 282 mounts at a secondary mounting portion of the liner element 220, which is in the form of a bore 232, and further mounts at the wear member mounting portion of the wear member 222, which is also in the form of a bore 244. In this way, the wear member 222 is mounted indirectly to the liner element 220.

The base plate 282 comprises first 284 and second apertures 286 therethrough. When installed, the first aperture 284 aligns with the bore 232 of the liner element 220 such that the liner element 232 can be secured to the base plate 282 by receipt of a bolt 288 (e.g. hex-head) therethrough. The first aperture 284 also aligns with a blade aperture 212 of the blade 206 such that the bolt 288 is also received therethrough. In this way, the bolt 288 is received through the bore 232, first aperture 284 and blade aperture 212 and can be retained in that position by way of a nut and washer arrangement. When arranged in this way, the base plate 282 is sandwiched between an upper surface of the blade 206 and a lower surface 240 of the liner element 220. A plug 290 can also be received in the bore 284 of the liner element 220 to fill space that isn't taken up by the head of the bolt 288.

The second aperture 286 aligns with the bore 244 of the wear member 222. In this way the wear member 222 can be mounted to the base plate 282 by way of a further bolt 292 (which may have an oval shaped head). This bolt 292 can be received through the bore 244 and the second aperture 286 and can be retained by way of a washer and nut arrangement.

Thus, the wear member 222 may be releasably mounted to the liner element 220 via the base plate 282. This mounting allows the wear member 222 to be replaced without needing to also remove the liner element 220 from the blade 206.

Now referring to FIGS. 3A to 4C, a further embodiment of a first liner segment, and a second liner segment are illustrated. The primary difference between this embodiment and the previous embodiments is the form of the secondary mounting portion and the wear member mounting portion. The further embodiment of the first liner segment 316 and second liner segment 316' generally includes the same features as the previously described liner segment 116 and 116', respectively, but differs in that the secondary mounting portions and the wear member mounting portions are reversed. Like reference numerals are used for like features. The prefix 3 is used in relation to the relevant reference numeral to identify the further embodiment.

FIGS. 3A to 3C generally shows a liner segment 316 (that comprises a liner element 120 and wear member 122) in more detail. The liner element 120 includes a plurality (in this case three) secondary mounting portions. In the illustrated embodiment, the secondary mounting portion includes protrusions 344 extending from the liner element 120. Locating the protrusions 344 on the first liner element 120 (rather than on the wear members 122) reduces the load on the protrusions 344 during operation of the agitator.

Each protrusion 344 extends from the distal edge 126 of the liner element 120 and has a generally rectangular profile. Raised mating surfaces 346 are provided on each protrusion 344 as previously described in relation to the protrusion 144. A recess in the form of a bore 348 extends through the protrusion 344 from the upper surface of the protrusion 344 to the lower surface of the protrusion 344. The bore 348 formed in the protrusion 344 has a generally circular cross-profile that tapers inwardly as described in protrusion 144, and is designed to receive the locking pin described above. The edges of the protrusion 344 and the distal edge 126 of the first liner element 120 are generally rounded to provide smoother edge transitions.

The wear member 122 is mountable to the liner element 120 to protect the edge of the helical blade as discussed above. The wear member 122 includes wear member mounting portions in the form of a plurality of sockets 332 (in this case three to mate with the protrusions 344). The socket 332 formed in the internal surface 142 of the wear member 122 is a complementary shape to the protrusion 344. The sockets 332 being located in the wear members 122 improves cleanability (from fine material debris) prior to maintenance inspections.

The edges of the entrance and internal edges of the socket 332 are rounded, also complementary to the round edges of protrusion 344. Raised mating surfaces 346 are provided in the socket 344 as previously described in relation to the socket 132. The socket 332 also includes an associated recess, in the form of a bore 350, which extends from the upper surface 334 of the wear member 122 (at the internal surface) through to the lower surface 336 of the wear member 122 (i.e., so as to extend across the socket 332). The bore 350 extends at an angle (i.e. on decline) relative to the upper surface 334 of the wear member 122 (i.e. in the direction of the internal surface 342 of the liner element 120).

As best illustrated in FIG. 3D, when the protrusion 344 is received in the socket 332, the bore 350 of the socket 332 and the bore 348 of the protrusion 344 align along a common longitudinal axis (to form a lock passage) as described in previous embodiments. Lock 152 previously described in liner segment 116 can be received in the aligned bores 348, 350, through the opening of the socket bore 350 at the upper surface 334 of the wear member 122. Placement of protrusions 344 on the distal edge 126 of the first liner element 120 means the locking pin can be located further from the machine center allowing for easier removal of the locking pin from the bottom of wear member elements 122. In particular, as shown in FIG. 3D, when the liner segment 316 is mounted to the agitator blade 106, the aligned bores containing the locking pin 152 are disposed beyond the outer edge 110 of the agitator blade 106. This provides a clear lower opening to the bore 350 that allows the lock 152 to be knocked out if need be. In this regard the bore 350 may taper towards the lower opening to facilitate the locks removal through the lower opening.

FIGS. 4A, 4B and 4C illustrate the further liner segment 316' with the further embodiment of the secondary mounting portion and the further embodiment of the wear member mounting portion. As discussed above, the further liner segment 316' is configured for mounting at the in use lower end of the shaft 102 and as a result, the end wear member 122' includes the wedge portion to protect the leading edge of the helical blade.

As shown in FIG. 4A to 4C, the liner element 120' further comprises a plurality (in this case four) secondary mounting portions, which in this embodiment comprise protrusions 344 and 345. Advantageously, locating protrusions 344 and 345 on the first liner element 120' reduces the load on the protrusions 344, 345 during operation of the agitator.

The protrusion 345 that extends from the distal edge 126 has a trapezoidal profile complementary to the socket 333 located in the wear member 122'. The protrusion 345 is larger than the protrusions 344 as protrusion 345 is the leading edge and experiences more wear than other the wear members protrusions 344. Raised mating surfaces 346 are provided on protrusion 345 as previously described on protrusion 344. In the illustrated embodiment, the protrusion 345 includes two recesses in the form of two bores 348' spaced apart that extends through the protrusion 345 from the upper surface of the protrusion 345 to the lower surface of the protrusion 345. The bores 348' formed in the protrusion 345 has a generally circular cross-profile that tapers inwardly as previously described in protrusion 344.

The locating protrusions 344 for the liner element 120' are arranged to be received in a socket (not shown) in the wear member 123' which is of the same construction as the socket 332 of the wear member 122 shown in FIG. 3C. Again, providing the sockets on the wear members 122', 123' improve cleanability (from fine material debris) prior to maintenance inspections.

The end wear member 122' includes the socket 333 formed in the end internal surface 142' has a trapezoidal profile and is larger in size than the previous embodiment of the socket 332. Raised mating surfaces 347 are provided on internal surfaces as previously described on socket 332. The socket 333 comprises two corresponding recesses in the form of two bores 350' that are spaced apart and extend from the upper surface 334' of the wear member 122' (at the internal surface) through to the lower surface 336' of the wear member 122' (i.e. so as to extend across the socket 333). The bores 350' formed in the wear member have a generally circular cross-profile and extend at an angle as previously described in socket 332.

Referring to FIG. 4A, when the protrusion 344, 345 is received in the socket 332, 333, the bores 350' of the socket 332, 333 and bore 348' of the protrusion 344, 345 align along a common longitudinal axis (to form a lock passage) as described in previous embodiments. The lock 152 previously described in relation to the liner segment 116 can be received in the aligned bores 348', 350', through the opening of the socket bore 350' at the upper surface 334' of the wear member 122'.

Variations and modifications may be made to the parts previously described without departing from the spirit or ambit of the disclosure.

For example the number of wear members per liner element can differ. For example, the liner element may only include one wear member, or two liner elements may share a wear member. Similarly, each liner element may include more than three wear members.

The number of secondary mounting portions may differ per liner element, and the number of wear member mounting portions may differ per wear member. The nature of the mounting portions may differ. It would be appreciated by the skilled person that other releasable mounting means may be used to mount the wear members to the liner element. For example, fasteners, depressible detents, snap-fit, and other such releasable mounting arrangements may be used.

The shape of the liner elements may differ to that described above. For example, liner elements in the form of a sector of a circle (or an entire circle) may be provided for agitators comprising disc shaped blades as opposed to the helical blades described above.

In an alternative embodiment (to that described above), the liner segment may be formed of a body portion and a peripheral portion that is formed of a different material to the body portion. The peripheral portion may be permanently secured or fixed to the body portion (in contrast to the releasable wear members). The material of the peripheral portion may be selected so as to be particularly suitable for resisting wear.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A vertical grinding mill agitator liner element configured for lining a vertical grinding mill agitator, the agitator comprising a shaft and at least one blade projecting from the shaft, the liner element comprising:
   a rigid body;
   one or more primary mounting portions including mounting apertures extending through the rigid body such that when the liner segment lines the vertical grinding mill agitator, the one or more primary mounting portions releasably mount the liner element over the at least one blade; and
   one or more secondary mounting portions configured to releasably mount one or more wear members to a distal edge of the liner element, wherein the one or more secondary mounting portions comprise either a protrusion for receipt in a socket or a socket for receipt of a protrusion, the protrusion or the socket extending in a single direction configured to allow independent replacement of the one or more wear members.

2. The liner element of claim 1 comprising:
   a proximate edge that locates proximate the shaft when the liner element is mounted to the at least one blade projecting from the shaft thereto; wherein
   the distal edge is distal from the shaft when the liner element is mounted to the at least one blade, and
   wherein the one or more secondary mounting portions are spaced along a peripheral edge of the liner element.

3. The liner element of claim 2, wherein the distal edge comprises an enlarged portion that defines a lip extending along the distal edge, wherein the lip extends over an edge of the at least one blade when mounted thereto.

4. The liner segment of claim 1, wherein the protrusion comprises a first recess, and the socket comprises a second recess, the first and second recesses being arranged such that when the protrusion is received in a respective socket, the first recess of the protrusion and the second recess of the respective socket respectively align to define a lock passage.

5. The liner segment of claim 4, further comprising one or more locks, a lock of the one or more locks for receipt in the lock passage to lock a respective protrusion in a respective socket.

6. The liner segment of claim 5, wherein one or more of the one or more locks comprises a retainer for releasably retaining the lock in a position in which the lock locks the protrusion respectively in the socket.

7. A liner segment configured for lining a vertical grinding mill agitator, the agitator comprising a shaft and at least one blade projecting from the shaft, the liner segment comprising a liner element and one or more wear members, the liner segment comprising:

the liner element comprising:
a rigid body;
one or more primary mounting portions including mounting apertures extending through the rigid body such that when the liner segment lines a vertical grinding mill agitator comprising at least one blade, the one or more primary mounting portions releasably mount the liner element over the at least one blade; and
one or more secondary mounting portions configured to releasably mount the one or more wear members to a distal edge of the liner element;
wherein the one or more wear members each comprise a wear member mounting portion for releasably mounting at least one of the one or more wear members to one of the one or more secondary mounting portions of the liner element, wherein the one or more secondary mounting portions comprise either a protrusion for receipt in a socket or a socket for receipt of a protrusion, the protrusion or the socket extending in a single direction configured to allow independent replacement of the one or more wear members.

8. The liner segment of claim 7 wherein:
each of the one or more secondary mounting portions comprises a protrusion; and
each of the one or more wear members comprises a socket for receipt of the protrusion of a respective secondary mounting portion.

9. The liner segment of claim 8, wherein the protrusion comprises a first recess, and the socket comprises a second recess, the first recess and the second recess being arranged such that when the protrusion is received in the respective socket, the first recess of the protrusion and the second recess of the respective socket respectively align to define a lock passage.

10. The liner segment of claim 9, further comprising a lock received in the lock passage to secure the protrusion in the respective socket.

11. The liner segment of claim 10, wherein the lock comprises a retainer for releasably retaining the lock in a position in which the lock secures the protrusion in the respective socket.

12. The liner segment of claim 7, wherein the liner element is formed of a different material to the one or more wear members.

13. The liner segment of claim 7 comprising a plurality of wear members.

14. The liner segment of claim 13, wherein the plurality of wear members form a peripheral edge of the liner segment having a continuous profile.

15. The liner segment of claim 13, wherein the plurality of wear members are adjacent one another to form a continuous peripheral edge of the liner segment.

16. A vertical grinding mill agitator liner segment configured for lining a vertical grinding mill agitator, the agitator comprising a shaft and at least one blade projecting from the shaft, the liner segment comprising:

a rigid body incorporating a mounting portion including one or more mounting apertures extending through the rigid body such that when the liner segment lines the vertical grinding mill agitator, the mounting portion releasably mounts the rigid body over the at least one blade; and
a peripheral portion arranged to extend around an edge of the rigid body, wherein the material composition of the rigid body is different from the material composition of the peripheral portion, wherein the peripheral portion comprises either a protrusion for receipt in a socket or a socket for receipt of a protrusion, the protrusion or the socket extending in a single direction configured to allow independent replacement of the material composition of the peripheral portion.

17. A liner segment configured for lining a vertical grinding mill agitator, the agitator comprising a shaft and at least one blade projecting from the shaft, the liner segment comprising a liner element and one or more wear members, the liner segment comprising:

the liner element comprising:
a rigid body;
one or more primary mounting portions including mounting apertures extending through the rigid body such that in use the one or more primary mounting portions releasably mount the liner element over the at least one blade; and
one or more secondary mounting portions configured to releasably mount the one or more wear members to a distal edge of the liner element, the one or more wear members comprising a respective wear member mounting portion for releasably mounting the respective wear member to a corresponding secondary mounting portion of the liner element,
wherein each of the one or more secondary mounting portions comprises either a protrusion for receipt in a socket or a socket for receipt of a protrusion, the protrusion or the socket extending in a single direction configured to allow independent replacement of the one or more wear members, and wherein the respective wear member mounting portion comprises a corresponding socket for receipt of the protrusion or a corresponding protrusion for receipt in the socket of the one or more secondary mounting portions,
wherein the protrusion comprises a first recess and the socket comprises a second recess, the first and second recesses being arranged such that when the protrusion is received in a respective socket, the first recess of the protrusion and the second recesses of the respective socket respectively align to define a lock passage.

18. The liner segment of claim 17, wherein:
each of the one or more secondary mounting portions comprises a protrusion; and
each of the one or more wear members comprises a socket for receipt of the protrusion of a respective secondary mounting portion.

* * * * *